US009942307B2

(12) United States Patent
Sheshagiri et al.

(10) Patent No.: US 9,942,307 B2
(45) Date of Patent: Apr. 10, 2018

(54) WEB APPLICATION SCRIPT MIGRATION

(71) Applicant: Samsung Electronics Company, Ltd., Suwon, Gyeonggi-Do (KR)

(72) Inventors: Mithun Sheshagiri, Navi-Mumbai (IN); Swaroop S. Kalasapur, San Jose, CA (US); Onur Aciicmez, San Jose, CA (US); Yu Song, Pleasanton, CA (US); Doreen Cheng, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 14/058,135

(22) Filed: Oct. 18, 2013

(65) Prior Publication Data

US 2014/0047015 A1    Feb. 13, 2014

Related U.S. Application Data

(63) Continuation of application No. 12/637,316, filed on Dec. 14, 2009, now Pat. No. 8,595,284.

(51) Int. Cl.
| | | |
|---|---|---|
| *H04L 29/08* | (2006.01) | |
| *G06F 9/45* | (2006.01) | |
| *G06F 9/50* | (2006.01) | |
| *G06F 9/54* | (2006.01) | |

(52) U.S. Cl.
CPC ............ *H04L 67/10* (2013.01); *G06F 8/51* (2013.01); *G06F 9/5027* (2013.01); *G06F 9/547* (2013.01); *G06F 2209/509* (2013.01); *Y02B 60/142* (2013.01)

(58) Field of Classification Search
CPC .................................. H04L 67/10; G06F 8/51
See application file for complete search history.

(56) References Cited

U.S. PATENT DOCUMENTS

| | | | |
|---|---|---|---|
| 5,812,843 A | 9/1998 | Yamazaki et al. | |
| 5,960,200 A | 9/1999 | Eager et al. | |
| 6,385,661 B1 * | 5/2002 | Guthrie .................. | G06F 9/548 709/203 |
| 6,954,799 B2 * | 10/2005 | Lerner ................ | H04L 63/0815 709/217 |
| 7,509,649 B2 | 3/2009 | Shenfield | |

(Continued)

OTHER PUBLICATIONS

Messer, A. et al., "Towards a Distributed Platform for Resource-Constrained Devices", Proceedings of the 22nd International Conference on Distributed Computing Systems (ICDCS'02), 2002, pp. 43-51, IEEE, United States.

(Continued)

*Primary Examiner* — Aaron Strange
(74) *Attorney, Agent, or Firm* — Sherman IP LLP; Kenneth L. Sherman; Hemavathy Perumal

(57) ABSTRACT

In a first embodiment of the present invention, a method is provided comprising: determining if a portion of a script of web application code within a web application is migratable to a remote infrastructure, wherein the portion of the script contains one or more functions; and modifying the portion of the script if the portion of the script is migratable, such that execution of the portion of the script results in the one or more functions being executed on the remote infrastructure, wherein the remote infrastructure is not restricted to the device on which the web application was designed or distributed.

20 Claims, 7 Drawing Sheets

(56) References Cited

U.S. PATENT DOCUMENTS

| | | | |
|---|---|---|---|
| 8,108,456 B2 | 1/2012 | Chen et al. | |
| 8,127,289 B2 | 2/2012 | Craft et al. | |
| 2002/0083208 A1* | 6/2002 | Abdelnur | H04L 29/06 719/310 |
| 2003/0056025 A1* | 3/2003 | Moses | G06F 17/3089 719/316 |
| 2006/0230319 A1 | 10/2006 | Ryali et al. | |

OTHER PUBLICATIONS

Gu, X. et al., "Adaptive Offloading for Pervasive Computing", Pervasive Computing, IEEE, Jul.-Sep. 2004, pp. 66-73, vol. 3, Issue 3, IEEE Computer Society, United States.

Anonymous, "Create entire apps using JavaScript and Ajax", pp. 1-4, at http:/jaxer.org, downloaded Dec. 14, 2009.

Anonymous, "Live Wire Developer's Guide—Contents," pp. 1-18, at http://docsrv.sco.com/INT_LiveWire/CONTENTS.html, downloaded Dec. 14, 2009.

Anonymous, "Rhino: JavaScript for Java," pp. 1-3, at http://www.mozilla.org/rhino/, downloaded Dec. 14, 2009.

U.S. Restriction Requirement for U.S. Appl. No. 12/637,316 dated Aug. 27, 2012.

U.S. Non-Final Office Action for U.S. Appl. No. 12/637,316 dated Nov. 9, 2012.

U.S. Final Office Action for U.S. Appl. No. 12/637,316 dated Apr. 12, 2013.

U.S. Advisory Action for U.S. Appl. No. 12/637,316 dated Jun. 24, 2013.

U.S. Notice of Allowance for U.S. Appl. No. 12/637,316 dated Jul. 18, 2013.

\* cited by examiner

WEB APPLICATION SCRIPT MIGRATION

CROSS-REFERENCE TO RELATED APPLICATIONS

This application is a continuation of U.S. patent application Ser. No. 12/637,316, filed on Dec. 14, 2009, incorporated herein by reference.

BACKGROUND OF THE INVENTION

1. Field of the Invention

The present invention relates to computing. More particularly, the present invention relates to the migration of web application scripts to remote computing devices.

2. Description of the Related Art

A web application, or webapp, is an application that is accessed via a web browser over a network (e.g. Internet, mobile phone network, etc.). A web application can also be a computer software application that is coded in a browser-supported language (such as HTML, CSS, JavaScript, Java, PHP, etc.) and reliant on a common web browser to render the application executable.

Web application code is typically stored on servers. At launch, the browser uses a web address such as a Uniform Resource Locator (URL) to fetch the web application code. The code is then downloaded to the device and the application is executed, either inside the browser or using the browser functionality. Over the course of execution, additional code can be downloaded and executed. The client device may also store the web application code locally, in which case the web application URL points to a local file. It is also possible that the web application is preloaded on the client device prior to delivery of the client device to a user. This is common with, for example, preloaded applications on cell phones or laptop computers.

Runtime interpretation of script code can slow down execution of web applications, relative to the execution speed of native applications. Specifically, most web applications are programmed using a scripting language (e.g., JavaScript) and such scripting languages need to be interpreted at runtime. Contrast this with common native applications, which compile their code prior to launch and thus do not require processor-intensive runtime interpretation. As a result, web applications are inherently slower than native applications. However, since scripting languages are interpreted at runtime, they provide interoperability between platforms. For example, a JavaScript code can run on any platform where a JavaScript engine is present. User interfaces written in HTML and CSS provide similar benefits and drawbacks.

Consumers increasingly expect mobile devices to deliver performances similar to more powerful devices, such as desktops. However, the drawbacks of web application scripts are actually intensified on mobile devices, which commonly have processors that are much less powerful than their desktop device counterparts. While the processing power of a desktop computer may be enough to give the user the impression that a web application is not much slower than a native application, such an experience is not mirrored on a mobile device, especially mobile devices having very limited processing power and memory space, such as cellular phones.

Nevertheless, more and more web applications are being developed for mobile devices, and the complexity of the web applications is also increasing. This is due to the ease of authoring, distribution, and maintenance of web applications and the platform independence and portability of such applications. Of course, the increasing profitability of web application development for mobile devices has played a huge role as well. The success of mobile device web application distribution portals such as iTunes from Apple, Inc., Android Market from Google, Inc., and Palm's Application Catalog has greatly increased the amount of revenues that can be generated from web application distribution.

Furthermore, the type of web applications developed has also expanded, so that they are not just limited to web pages anymore. Widgets, offline applications, games, and productivity software are examples of increasingly common types of web applications.

The capabilities of web applications are also growing. Ajax (short for asynchronous JavaScript+XML) allows web applications to retrieve data from a server asynchronously, in the background, without interfering with the display and behavior of the existing page. The use of Ajax techniques has led to an increase in interactive or dynamic interfaces. Other techniques such as worker threads and canvas scripting have increased the complexity of web applications.

Of course, the increase in web application complexity only multiplies the slower processing issues of web application scripts, especially when run on lesser-powered processors on mobile devices.

SUMMARY OF THE INVENTION

In a first embodiment of the present invention, a method is provided comprising: determining if a portion of a script of web application code within a web application is migratable to a remote infrastructure, wherein the portion of the script contains one or more functions; and modifying the portion of the script if the portion of the script is migratable, such that execution of the portion of the script results in the one or more functions being executed on the remote infrastructure, wherein the remote infrastructure is not restricted to the device on which the web application was designed or distributed.

In a second embodiment of the present invention, a method for launching a web application on a client device is provided, wherein the web application includes web application code script, the method comprising: retrieving one or more functions from the web application code script that have been identified as migratable; for each of the one or more functions: sending a copy of the function to a remote infrastructure; receiving a web address from the remote infrastructure, wherein the web address is such that, upon invocation, the remote infrastructure runs the copy of the function; and creating a stub function containing the web address, such that when the stub function is executed by the client device, the web address is invoked.

In a third embodiment of the present invention, a method for executing a web application function on a client device is provided, the method comprising: receiving a call of a stub function from a software program, wherein the stub function has an identical signature to the web application function, wherein the stub function contains a web address of a remote function on a remote infrastructure; invoking the web address in order to cause the remote infrastructure to run the remote function; receiving values computed during the remote infrastructures running of the remote function; and passing the values to the software program as if the client device had run the web application function.

In a fourth embodiment of the present invention, a method for loading a web application function in a remote infrastructure is provided, the method comprising: receiving a copy of a web application function from a remote connection manager of a client device; loading the copy of the web application function for running; creating a web address corresponding to the copy of the web application function, wherein the web address is such that, upon invocation at the client device, the copy of the web application function is run by the web application environment; and sending the web address to the client device.

In a fifth embodiment of the present invention, an extended browser is provided comprising: a source code analyzer configured to examine web application script to determine if functions within the web application script are migratable; a source code manager configured to, for any functions that are migratable, create a stub function containing a remote function call; and a remote connection manager configured to pass a copy of any functions that are migratable to a remote infrastructure, receive web address for each of the remote functions from the remote infrastructure, and pass the web addresses to the source code manager; and wherein the source code manager is further configured to insert the web addresses into corresponding stub functions such that, upon execution of a stub function, a corresponding web address is invoked such that the remote infrastructure runs a corresponding remote function and returns the results.

In a sixth embodiment of the present invention, an apparatus is provided comprising: a web application environment configured to: receive a copy of a web application function from a remote connection manager of a client device; load the copy of the web application function for running; create a web address corresponding to the copy of the web application function, wherein the web address is such that, upon invocation at the client device, the copy of the web application function is run by the web application environment; and send the web address to the client device.

In a seventh embodiment of the present invention, an apparatus is provided comprising: means for determining if a portion of a script of web application code within a web application is migratable to a remote infrastructure, wherein the portion of the script contains one or more functions; and means for modifying the portion of the script if the portion of the script is migratable, such that execution of the portion of the script results in the one or more functions being executed on the remote infrastructure, wherein the remote infrastructure is not restricted to the device on which the web application was designed or distributed.

In an eighth embodiment of the present invention, a program storage device readable by a machine is provided tangibly embodying a program of instructions executable by the machine to perform a method comprising: determining if a portion of a script of web application code within a web application is migratable to a remote infrastructure, wherein the portion of the script contains one or more functions; and modifying the portion of the script if the portion of the script is migratable, such that execution of the portion of the script results in the one or more functions being executed on the remote infrastructure, wherein the remote infrastructure is not restricted to device on which the web application was designed or distributed.

DETAILED DESCRIPTION OF SPECIFIC EMBODIMENTS

Figure 1:
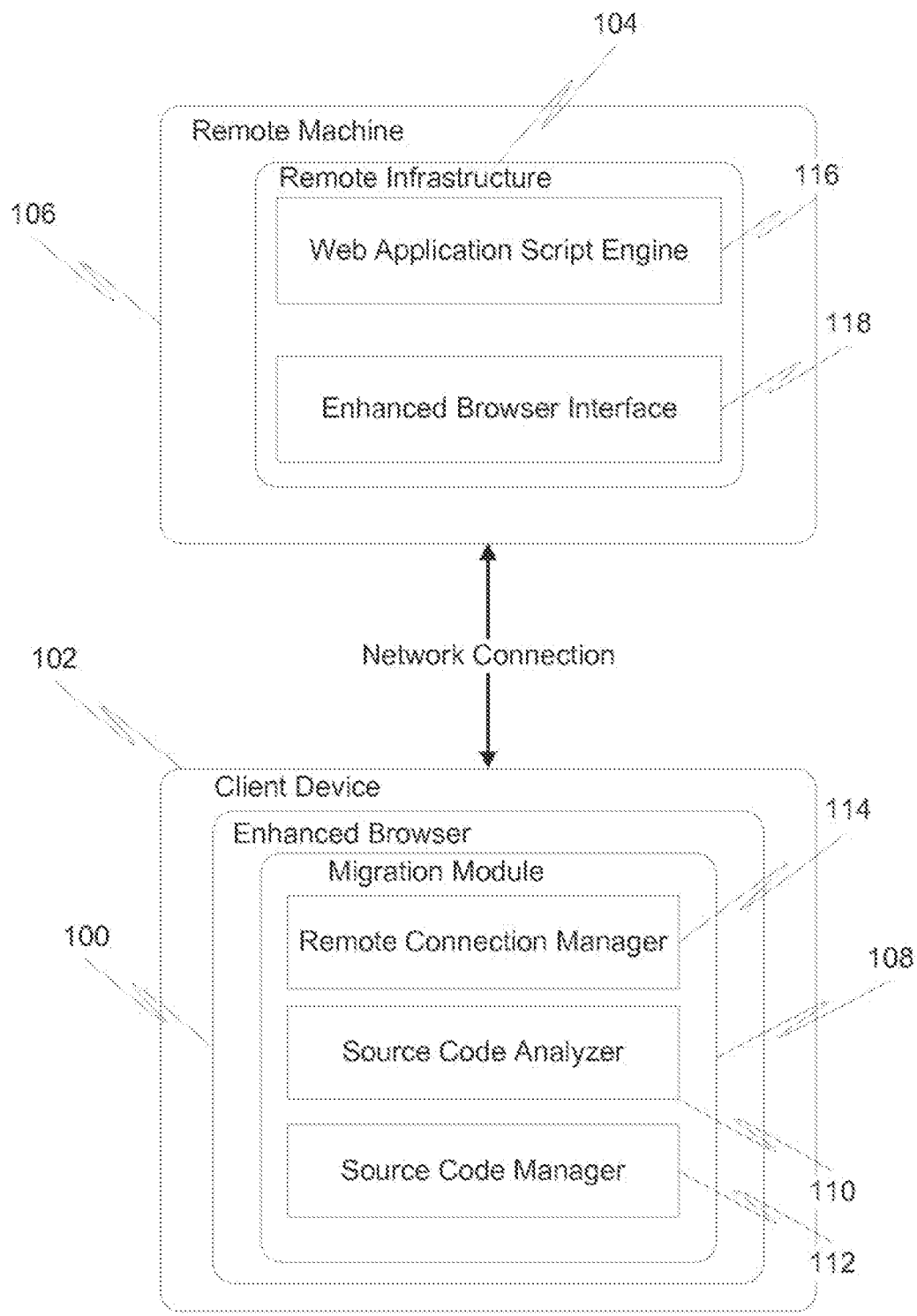
FIG. 1 is a diagram illustrating a system architecture in accordance with an embodiment of the present invention, and depicts the two functional blocks.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, a web browser is designed that has the capability to migrate code written in a web application scripting language, such as JavaScript, to a potentially faster remote computing device, such as a server. This server need not be the same server on which the web application code was developed, or even a server controlled or authorized by the creator of the web application code. Rather, the selection of the remote computing device is completely up to the client.

By performing computation-intensive processing on a faster remote machine, the performance of existing web applications can be increased. This not only will dramatically improve the user experience, but also will allow web application developers to have the freedom to write even more computation-intensive applications.

Apart from the gains in speed of execution described above, the present invention can also potentially lead to resource conservation, such as a reduction of battery power consumption.

Furthermore, the present invention keeps the compatibility of existing web applications, while only requiring very minimal changes to existing codes.

It should be noted that this document describes the invention using JavaScript as the main web application scripting language. However, one of ordinary skill in the art will recognize that any web application scripting language could be used.

In an embodiment of the present invention, two functional blocks are utilized to achieve migration of web application code. FIG. 1 is a diagram illustrating a system architecture in accordance with an embodiment of the present invention, and depicts the two functional blocks. An enhanced browser 100 operates on a client device 102. The client device 102 may be any client device, such as a cell-phone, set-top box, laptop, or desktop. The second functional block is a remote infrastructure 104 operating on a remote machine 106. The type of machine 106 can also vary. While embodiments where the machine 106 is a server, such as a desktop-based server, are likely, embodiments are also foreseen where the machine 106 is another device operated by the user who operates the client device 102, such as a laptop when the client device 102 is a cell phone. The remote machine 104 can also be a pool of lesser powered computing devices, such as a group of neighboring cell phones. For example, if the user's cell phone is a company cell phone, the company may have set the phone up so that it can migrate code to other company cell phones within the same vicinity that aren't being used, in order to distribute the processing tasks among all the available resources.

It should also be noted that the development of the web application code itself need not occur on a traditional server. As such, the use of the term "server" to describe the apparatus upon which the web application code was developed shall be construed broadly to mean any software or hardware device that sends data to a client software or hardware device.

Figure 2:
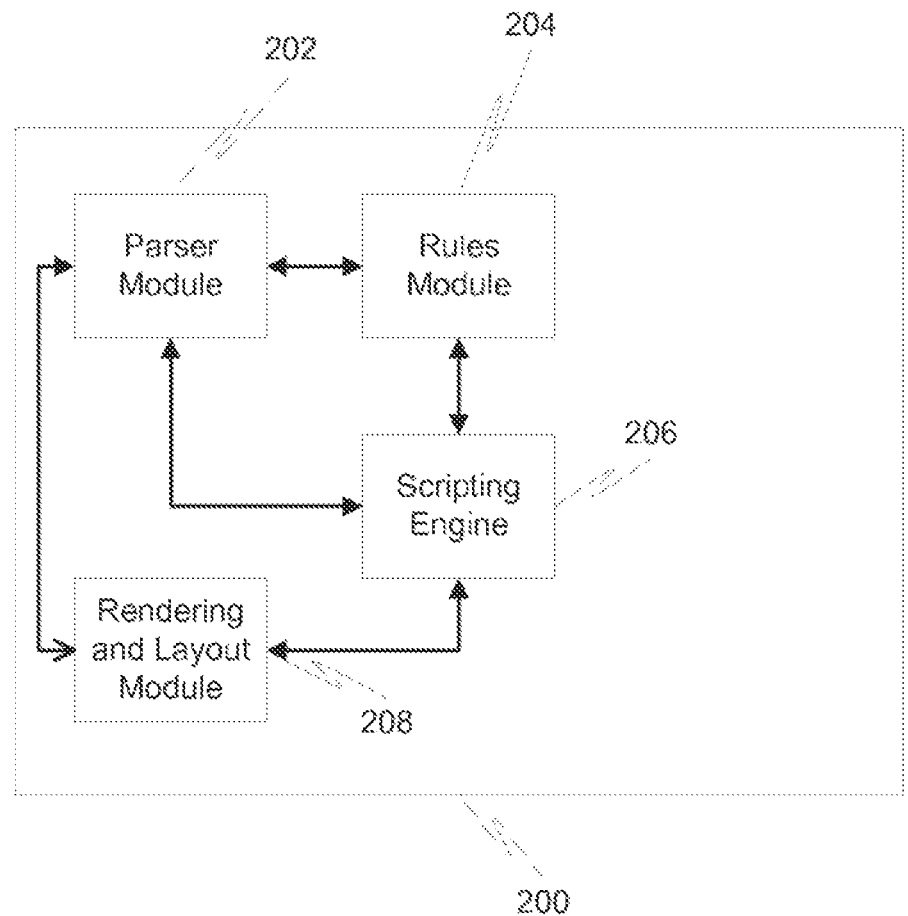
FIG. 2 is a diagram illustrating a typical web browser.

FIG. 2 is a diagram illustrating a typical web browser. The web browser 200 has a series of components. This may include a parser module 202, a rules module 204, a rendering and layout module 206, and a scripting engine 208. The parser module 202 is responsible for parsing web application script, as well as other web languages such as HTML and CSS, and for constructing a data structure representing the document. Typically this data structure is the Document Object Model (DOM). A rules module 204 is responsible for applying rules that determine the visual appearance of the web application, such as CSS rules. A rendering and layout module 206 is responsible for rendering the user interface of the web application. A scripting engine 208 is responsible for executing the web application script, such as JavaScript. It should be noted that these modules are frequently updated. For example, the browser may not be distributed with JavaScript capabilities, but the user of the browser may later download and install a JavaScript engine to enable such capabilities.

Figure 3:
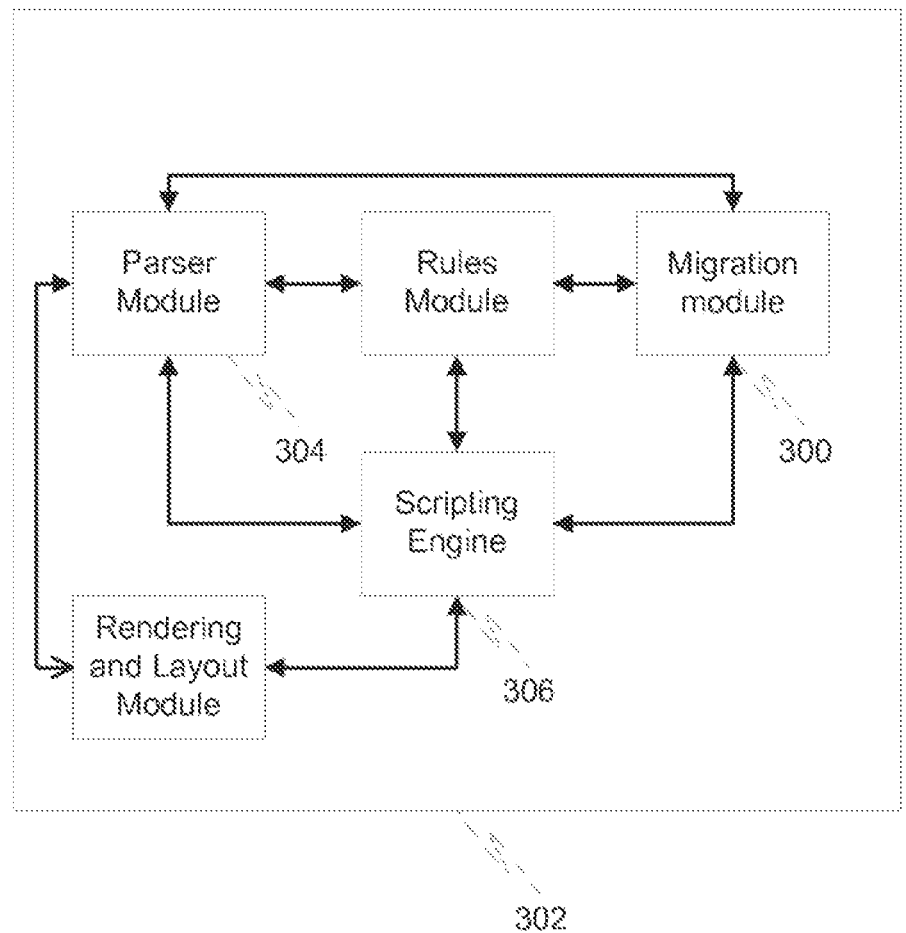
FIG. 3 is a diagram illustrating an enhanced web browser in accordance with an embodiment of the present invention.

FIG. 3 is a diagram illustrating an enhanced web browser in accordance with an embodiment of the present invention. A migration module 300 is added to the browser 302. This migration module 300 sits in the path between the parser module 304 and the scripting engine 306. The migration module 300 is responsible for handling annotated script, as described later, to enable remote execution.

Referring back to FIG. 1, the migration module 108 is pictured in the enhanced browser 100. The migration module 108 includes a source code analyzer 110, a source code generator 112, and a remote connection manager 114.

The source code analyzer 110 identifies web application script that can be migrated to a remote machine. This can be performed in a number of different ways. In one embodiment of the present invention, developers can annotate script tags with special attributes to explicitly inform the source code analyzer 110 of the code that needs to be migrated. This will be described in more detail below. In another embodiment of the present invention, the source code analyzer 110 can examine the script code and determine on its own whether sections are migratable or not. This can be challenging as web applications are very dynamic, and thus it is difficult to tell until runtime how many resources a particular section of code may need. However, embodiments are foreseen where a threshold or thresholds are utilized to determine whether a particular code section is migratable. These thresholds may be resource related, such as the device having available battery power below a certain amount, and/or network bandwidth being above a certain amount, making migration more possible/desirable. The determination could also be more intelligent, weighing many factors and the script code itself to determine whether or not a code section is migratable.

As will be described later, the granularity on which the web application script is divided into migratable and non-migratable sections can vary. In one embodiment, an entire web application script (as delineated by a <script> tag>) can be identified as migratable. In another embodiment, individual functions (as delineated by "function" headers) can be identified as migratable. In other embodiments, other sections of code may be delineated as migratable.

The source code manager 112 generates additional web application source code for each section of code identified for migration by the source code analyzer 110. In an embodiment of the present invention, this includes generating a stub function. A stub function essentially acts as a proxy for actual source code. Thus, if the migratable source code is a particular function, the stub function is called in the same way as the function would normally be called, having the same signature (name, input parameters, and return type) as the underlying function. However, the source code manager 112 replaces the contents of the function with simply a call to a remote function. Essentially, the inside of the function has been stripped, leaving only a redirection call to a remote function. The source code manager 112, then creates a remote function that has code identical to the original function, but is meant for execution on a remote machine. In this way, the source code manager 112 works directly with the remote connection manager 114, which is described below, in order to obtain the necessary information about the remote machine used for the migration, in order to properly create the stub function and remote function.

The remote connection manager 114 is responsible for setting up the connection between the enhanced browser 100 and the remote infrastructure 104. This can be performed in a number of different ways. In one embodiment of the present invention, the remote connection manager 114 contains a list of remote infrastructure servers that can execute code for the client. It may then pick a remote infrastructure server from the list at the time the web application is launched, either randomly or based on certain parameters, such as user preference or network latency. Once the remote infrastructure server is identified, the URL for the remote infrastructure server is added to the stub function by the source code manager 112. An interface between the remote connection manager 114 and the source code manager 112 is provided to exchange this information. The remote connection manager 114 then sends the remote function generated by the source code manager 112 to the selected remote infrastructure server(s), along with the URL of the web application. The remote connection manager 114 maintains sessions for each web application. If the web application is not used for a long time or is unloaded from the browser, it destroys the session.

Turning now to the remote side, a remote infrastructure 104 contains a web application script engine 116 that executes the web application script. Additionally, an interface 118 is provided to load and execute the web application script within the application script engine 116.

The remote infrastructure 104 runs on a remote machine, such as a desktop or laptop computer, a server, or a cloud. It receives web application functions from the remote connection manager 114 along with the URL of the web page on which the functions were found. For each unique web page URL, the remote infrastructure 104 creates an instance of the web application environment and loads the function into it. It then creates a corresponding URL for the function and sends it back to the remote connection manager 114. When the client then invokes this URL, the corresponding function is executed in the remote infrastructure's environment and the values returned by the function are sent back to the client. The remote infrastructure also provides an interface to destroy the created instances.

In an alternative embodiment, the remote functions need not be "set up" for execution by the remote infrastructure, but rather can be executed by the remote infrastructure immediately when sent by the client (i.e., at runtime). In such an instance, there is no need for the remote infrastructure to send a URL to the client to invoke the functionality. The client simply sends the migratable code to the remote infrastructure when it needs to be executed, with instructions to execute the code. The remote infrastructure then executes the presented code and returns the results. In this case, the remote infrastructure exposes a generic "evaluate" (or execute) method that can take any script body, execute it, and return the results.

Figure 4:
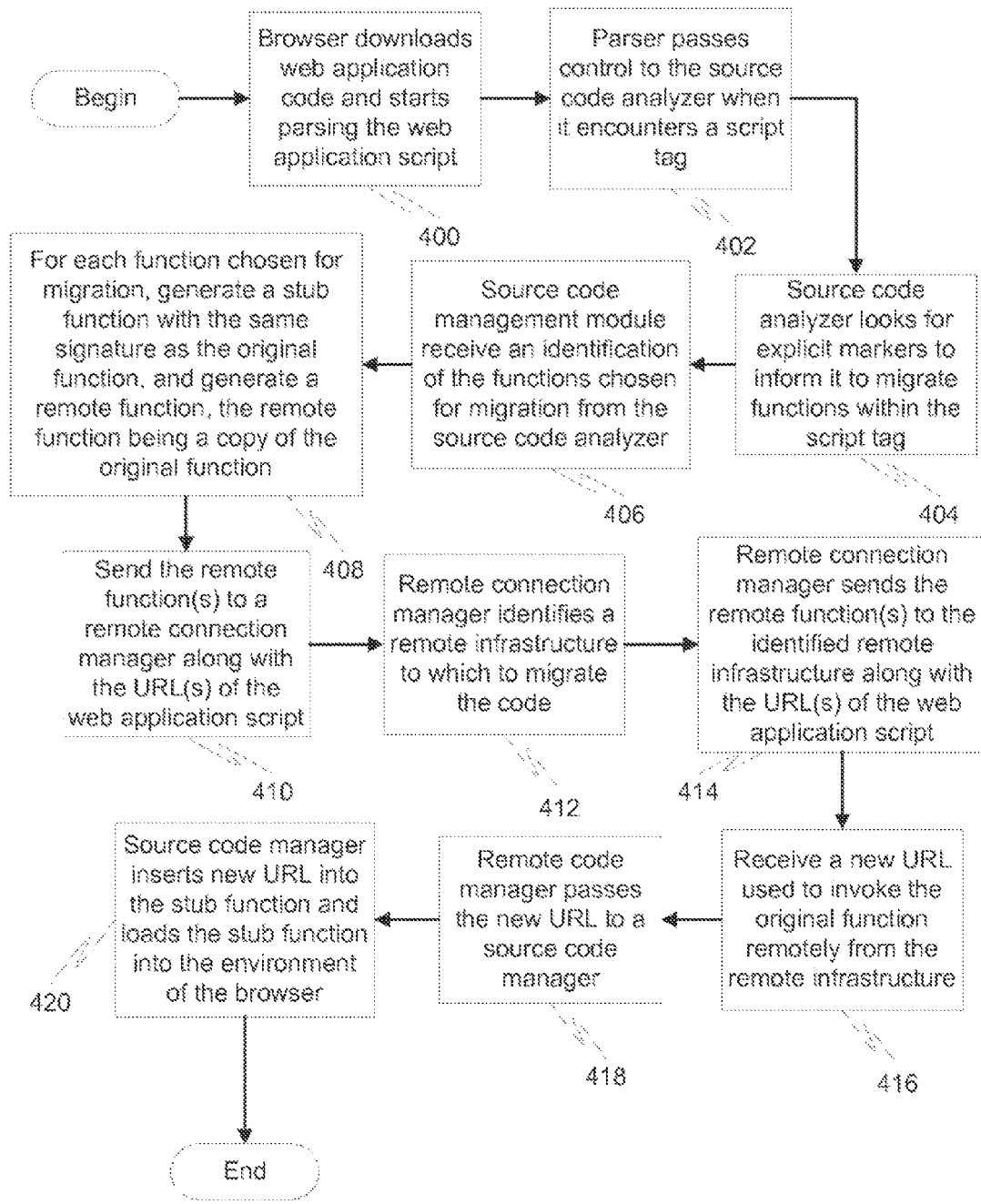
FIG. 4 is a flow diagram illustrating a method for launching a web application in an enhanced browser in accordance with an embodiment of the present invention.

FIG. 4 is a flow diagram illustrating a method for launching a web application in an enhanced browser in accordance with an embodiment of the present invention. This method is intended to be executed upon launch of the web application by a client, however, embodiments are foreseen wherein the method may be executed again while the web application is running in order to refresh or otherwise alter the remote infrastructures being used to run the migratable code. At 400, the browser downloads the web application code and starts parsing the web application script. At 402, when the parser encounters a script tag (e.g., <script>), it passes control to the source code analyzer. At 404, the source code analyzer looks for explicit markers, such as special attributes, to inform it to migrate functions within the script tag. There are different embodiments as to different types of explicit markets, which will be described in more detail later. At 406, the source code manager receives an identification of the functions chosen for migration from the source code analyzer.

At 408, for each function chosen for migration, a stub function is generated with the same signature as the original function, and a remote function is also generated, the remote function being a copy of the original function. At 410, the source code manager sends the remote function to a remote connection manager along with the URL of the web application script. At 412, the remote connection manager identifies a remote infrastructure to which to migrate the code. At 414, the remote connection manager sends the remote function to the identified remote infrastructure along with the URL of the web application script. At 416, a new URL used to invoke the original function remotely is received from the remote infrastructure. At 418, the remote code manager passes the new URL to a source code manager. At 420, the source code manager inserts the new URL into the stub function and loads the stub function into the environment of the browser.

Figure 5:
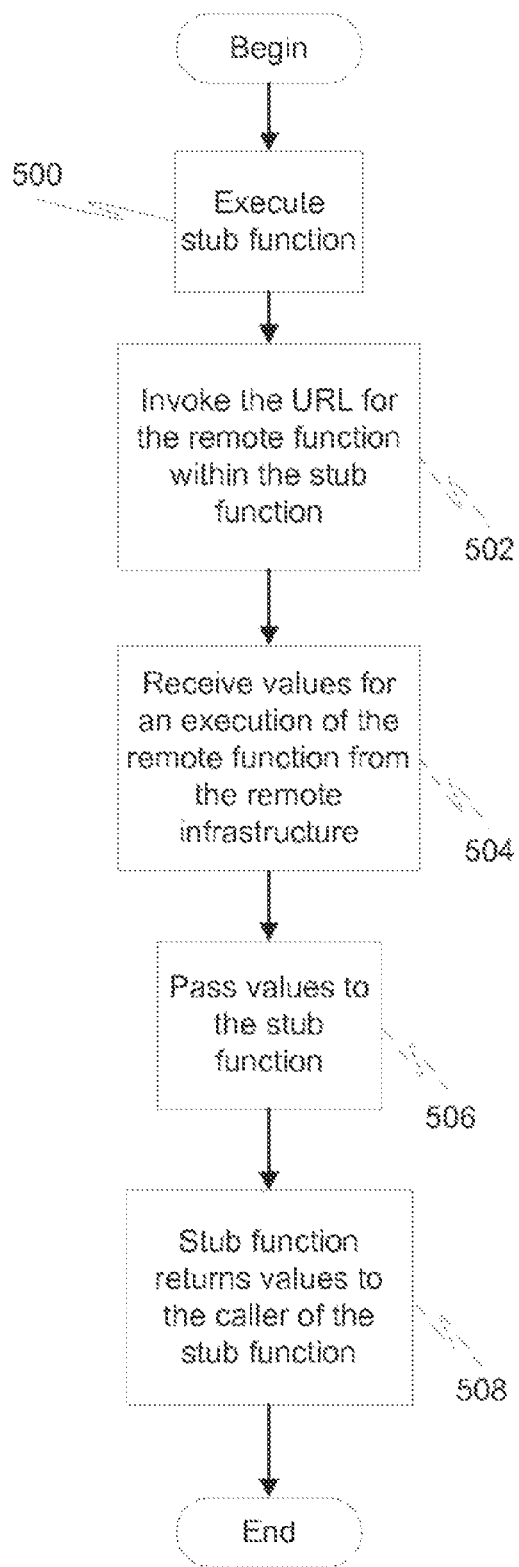
FIG. 5 is a flow diagram illustrating a method for executing a function of a web application script in accordance with an embodiment of the present invention.

FIG. 5 is a flow diagram illustrating a method for executing a function of a web application script in accordance with an embodiment of the present invention. It is assumed at this point that the method described above in FIG. 4 has been executed upon launch of the web application. At 500, the stub function is executed. At 502, the URL for the remote function within the stub function is invoked. At 504, values for an execution of the remote function are received from the remote infrastructure. At 506, these values are passed to the stub function. At 508, the stub function returns the values to the caller of the stub function.

What follows is an example of an execution of the above methods on a web application script. One of ordinary skill in the art will recognize that this is only an example, and is not intended to be limiting. A fragment of the script or marked for migration by developers as follows:

---

Original Web Application Script

```
<html>
//normal script
<script>
function a( ){
//body of function a
return a;
}
</script>
//script marked for migration
<script migratable=true>
function b( ){
//body of function b
return b;
}
</script>
<body>
// rest of the web application
</body>
<html>
```

---

The above script is then modified by the Enhanced Browser. The function marked for migration is replaced with a stub function. The stub function communicates with the remote function running on the remote infrastructure. For the web application, the original and the stub function appear identical in their behavior. In this embodiment, the original function marked for migration is not loaded into the browser.

---

Modified Web Application Script

```
<html>
// normal script remains unchanged
<script>
function a( ){
//body of function a
return a;
}
</script>
// script modified to support migration
<script migratable=true>
// stub function for b
function b( ){
```

-continued

Modified Web Application Script

```
//call to remote function on the server
... ...
// value from remote function returned
return remote_b;
}
</script>
<html>
```

The original function is then run on the web application environment on the remote infrastructure.

Remote function running on remote infrastructure

```
function b( ){
//body of function b
return b;
}
```

While the embodiment described above supports marking an entire script region (enclosed within <script> and </script> tags) as being migratable, it might be restrictive or inconvenient for the developers. Specifically, if a developer wishes for some functions within a web application to be migratable and some to be non-migratable, and both types are contained within a single <script> tag, then the developer must alter the script to create a separate script tag for the non-migratable functions and move all the non-migratable functions to that new script tag. As such, additional embodiments are provided to enable a developer to annotate individual functions.

Individual functions can be annotated as candidates for remote execution with a simple language extension to the web application script. A sample syntax is described below, however, one of ordinary skill in the art will recognize that there are other syntaxes that could be utilized for the same purpose.

The following snippet is a normal JavaScript code block that is marked as migratable at the <script> </script> block level.

```
<script migratable=true>
function b( ){
//body of function b
return b;
}
function c( ) {
//Body of the function c
return c;
}
function d( )
{
//Body of function d
return d;
}
//More functions
</script>
```

In the code snippet above, all the functions within the <script migratable=true> block are marked for migration. If the developer intends to mark only a subset of the functions as candidates for migration, the following annotation shown the code snippet below can be employed. The mechanism for achieving migration is the same as the original embodiment.

```
<script>
function b( ): migratable
{
//body of function b
return b;
}
function c( ) {
//Body of the function c
return c;
}
function d( ): migratable
{
//Body of function d
return d;
}
//More functions
</script>
```

The difference between the two code snippets is that, in the first, all functions within the <script> </script> block are marked as migratable. In the second, however, only individual functions (b and d) are marked as migratable.

While developing large applications, it would also be convenient for developers to mark individual functions as non-migratable. This can also be achieved with a simple extension to web application as shown below.

```
<script migratable=true>
function b( ){
//body of function b
return b;
}
function c( ) :non-migratable
{
//Body of the function c
return c;
}
function d( )
{
//Body of function d
return d;
}
//More functions
</script>
```

With the extension shown above, all functions within the <script> </script> block with "migratable=true" attribute set will be marked for migration as a default, except for only those which are specifically annotated as "non-migratable".

As described earlier, the ultimate decision as to whether or not to migrate a function or script lies with the client. As such, even if the code is marked as migratable by the developer, the client can make the decision as to whether or not it makes sense to migrate the code. However, embodiments are possible wherein the developer can indicate that certain pieces of code must or must not be migrated, rather than simply indicating that they are migratable. As such, embodiments are also possible wherein the extensions used by the developer are able to specify whether a function must be migrated. The extensions could also specify that the function is unable to be migrated, as distinguished from specifying that it is recommended, but not mandatory, that the code not be migrated.

Furthermore, an embodiment was described above for discovering a remote machine based on a predefined list, to which the code can be offloaded. In an alternate embodiment, another mechanism is provided by which a client device can discover a remote machine to which the code can be offloaded. In this alternative embodiment, the remote connection manager on the client device is modified to scan (a) the vicinity/local network, or (b) the Internet, to communicate with a remote machine, as opposed to simply picking from a list.

Scanning the local network can be implemented as a message broadcast over a pre-agreed port. The remote machines which are capable of providing support for migration are listening on this pre-defined port and respond to any incoming requests. This request-response protocol can then be used to identify a remote machine.

To contact a remote machine on the wider area network, a directory service (similar to the DNS service) can be established, which keeps information about the available remote machines. The client device that needs one or more corresponding remote machines can communicate with the directory service to gain access to the required remote machines. It should be noted that there can be many other ways of enabling the same feature.

It should also be noted that it is not necessary that the web application actually be received directly from a server. The web application may be pre-installed on the client device, such as applications that are installed on cellular phones prior to shipment to customers. One key aspect here, however, is the fact that the remote infrastructure can be a device other than a server, such as a server, on which the web application was created or distributed.

Figure 6:
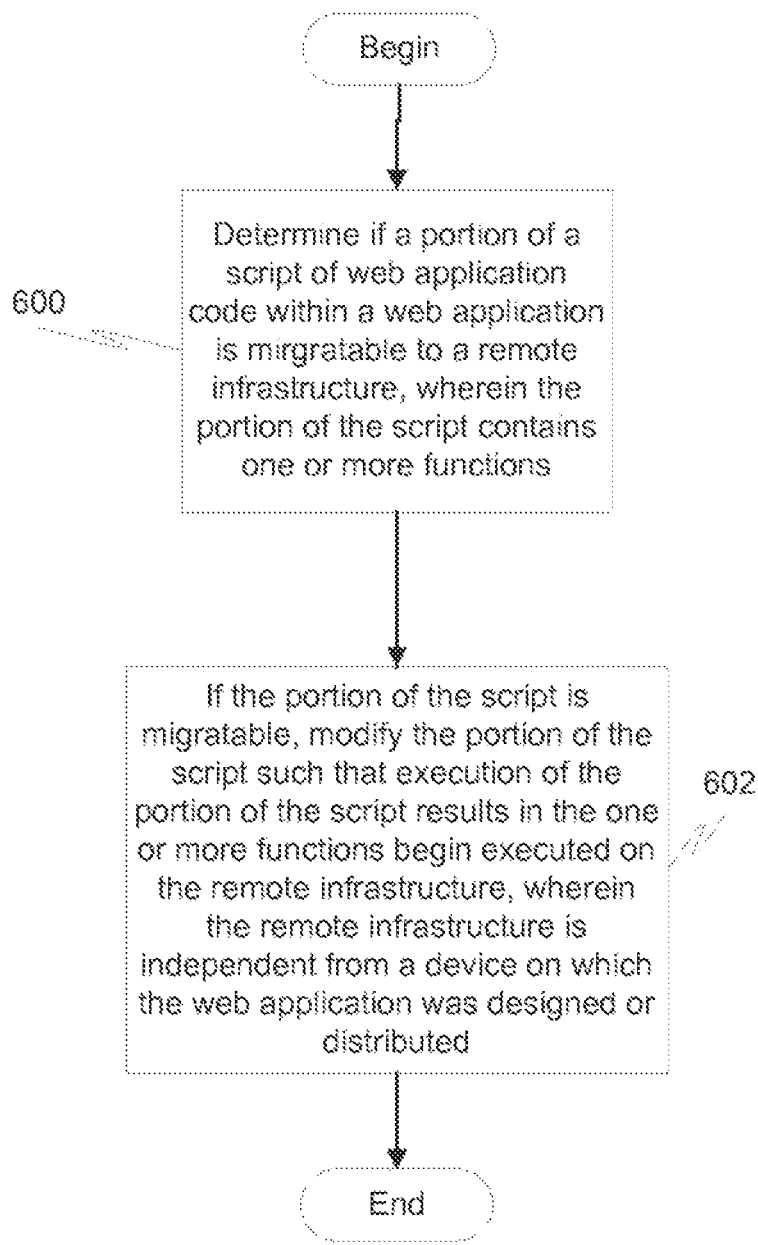
FIG. 6 is a flow diagram illustrating a method in accordance with another embodiment of the present invention.

FIG. 6 is a flow diagram illustrating a method in accordance with another embodiment of the present invention. This method may be executed by a client device. More particularly, this method may be executed by, for example, a web browser operating on a client device. At 600, it is determined if a portion of a script of web application code within a web application is migratable to a remote infrastructure, wherein the portion of the script contains one or more functions. This may include, for example, examining the script to identify whether one or more functions have been identified within the script as migratable, such as a script section identified as migratable that contains the functions, or even the functions identified individually as being migratable. At 602, if the portion of the script is migratable, the portion of the script is modified such that execution of the portion of the script results in the one or more functions being executed on the remote infrastructure, wherein the remote infrastructure is not a device on which the web application was designed or distributed. Both 600 and 602 may be performed upon launch of the web application, or at a later time.

Figure 7:
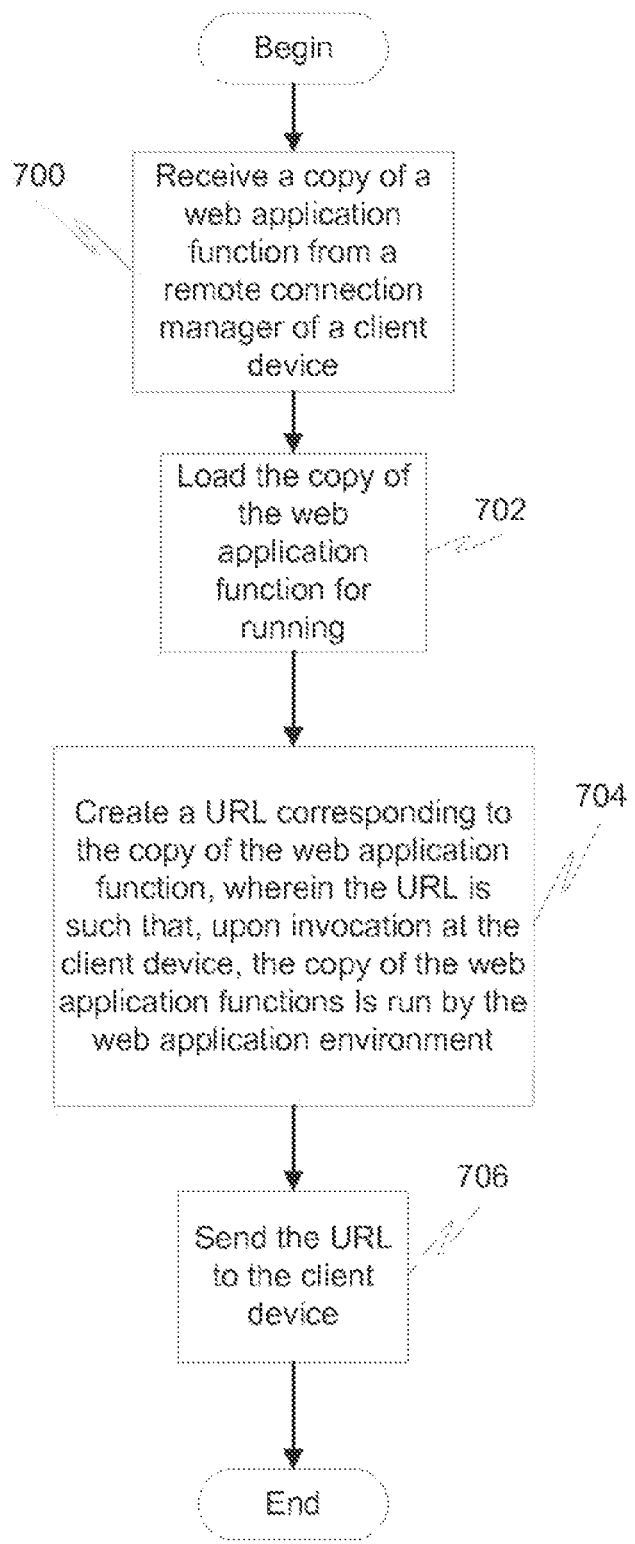
FIG. 7 is a flow diagram illustrating a method for loading a web application function in a remote infrastructure in accordance with an embodiment of the present invention.

FIG. 7 is a flow diagram illustrating a method for loading a web application function in a remote infrastructure in accordance with an embodiment of the present invention. This method is performed by a remote infrastructure in communication with a client device. At 700, a copy of a web application function is received from a remote connection manager of a client device. At 702, the copy of the web application function is loaded for running. At 704, a URL corresponding to the copy of the web application function is created, wherein the URL is such that, upon invocation at the client device, the copy of the web application function is run by the web application environment. At 706, the URL is sent to the client device.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for launching a web application on a client device, the method comprising:
   identifying a migratable function within a web application script of the web application by parsing the web application script for a set of markers delineating a code section of the web application script comprising the migratable function;
   offloading code for the migratable function to a remote infrastructure by:
      sending a copy of the migratable function to the remote infrastructure;
      receiving a corresponding web address for the copy of the migratable function on the remote infrastructure from the remote infrastructure;
      modifying the code section of the web application script by:
         generating additional code for the migratable function, wherein the additional code includes a stub function comprising a call to the copy of the migratable function on the remote infrastructure utilizing the corresponding web address; and
         replacing the migratable function within the code section of the web application script with the stub function; and
   invoking the corresponding web address in response to execution of the stub function on the client device to cause the copy of the migratable function on the remote infrastructure to run.

2. The method of claim 1, wherein the remote infrastructure comprises one of the following: a computer server, a plurality of computer servers grouped as a cloud, another client device, or a group of client devices.

3. The method of claim 1, wherein the method is performed at a web browser on the client device, and the stub function is loaded into an environment of the web browser.

4. The method of claim 1, wherein the method further comprises:
   downloading web application code including the web application script to the client device.

5. The method of claim 1, wherein identifying a migratable function within a web application script of the web application further comprises:
   determining whether one or mode code sections of the web application script are migratable based on one or more thresholds relating to available resources of the client device.

6. The method of claim 1, further comprising:
   discovering the remote infrastructure by:
      examining a preconfigured list of remote infrastructures; and
      randomly selecting an available remote infrastructure from the list, wherein the copy of the migratable function is sent to the selected remote infrastructure.

7. The method of claim 1, further comprising:
   discovering the remote infrastructure by:
      scanning for one or more available remote infrastructures in a network connected to the client device; and
      selecting an available remote infrastructure from the one or more available remote infrastructures, wherein the copy of the migratable function is sent to the selected remote infrastructure.

8. The method of claim 1, further comprising:
receiving one or more execution results returned by the copy of the migratable function on the remote infrastructure.

9. The method of claim 1, further comprising:
in response to execution of the stub function on the client device by a software program:
receiving the call to the copy of the migratable function from the software program, wherein the stub function comprises a signature that is identical to the migratable function;
invoking the corresponding web address to cause the copy of the migratable function on the remote infrastructure to run;
receiving one or more values returned by the copy of the migratable function on the remote infrastructure; and
passing the one or more values to the software program.

10. The method of claim 9, wherein the remote infrastructure comprises one or more computer devices controlled by a user of the client device.

11. A method for loading a web application function in a remote infrastructure, the method comprising:
receiving a copy of the web application function from a client device, wherein the web application function is identified as migratable in response to parsing a web application script of the web application at the client device for a set of markers delineating a code section of the web application script comprising the web application function;
loading the copy of the web application function in the remote infrastructure for running;
creating a corresponding web address for the copy of the web application function in the remote infrastructure;
sending the corresponding web address to the client device, wherein the code section of the web application script at the client device is modified by replacing the web application function within the code section with additional code generated for the web application function, the additional code including a stub function comprising a call to the copy of the web application function in the remote infrastructure utilizing the corresponding web address; and
running the copy of the web application function in the remote infrastructure in response to invocation of the stub function at the client device.

12. The method of claim 11, wherein the remote infrastructure is distinct from a server from which the web application function is obtained by the client device.

13. The method of claim 11, wherein the remote infrastructure comprises one of the following: a computer server, a plurality of computer servers grouped as a cloud, another client device, or a group of client devices.

14. The method of claim 11, further comprising:
executing the copy of the web application function in the remote infrastructure; and
sending one or more execution results returned by the copy of the web application function in the remote infrastructure to the client device.

15. A system comprising:
at least one processor; and
a non-transitory processor-readable memory device storing instructions that when executed by the at least one processor causes the at least one processor to perform operations including:
identifying a migratable function within a web application script of the web application by parsing the web application script for a set of markers delineating a code section of the web application script comprising the migratable function;
offloading code for the migratable function to a remote infrastructure by:
sending a copy of the migratable function to the remote infrastructure;
receiving a corresponding web address for the copy of the migratable function on the remote infrastructure from the remote infrastructure;
modifying the code section of the web application script by:
generating additional code for the migratable function, wherein the additional code includes a stub function comprising a call to the copy of the migratable function on the remote infrastructure utilizing the corresponding web address; and
replacing the migratable function within the code section of the web application script with the stub function; and
invoking the corresponding web address in response to execution of the stub function on the client device to cause the copy of the migratable function on the remote infrastructure to run.

16. The system of claim 15, wherein the stub function comprises a single command to invoke the corresponding web address.

17. The system of claim 15, wherein the remote infrastructure comprises one of the following: a computer server, a plurality of computer servers grouped as a cloud, a client device, or a group of client devices.

18. A system comprising:
at least one processor; and
a non-transitory processor-readable memory device storing instructions that when executed by the at least one processor causes the at least one processor to perform operations including:
receiving a copy of a web application function from a client device, wherein the web application function is identified as migratable in response to parsing a web application script of the web application at the client device for a set of markers delineating a code section of the web application script comprising the web application function;
loading the copy of the web application function for running;
creating a corresponding web address for the copy of the web application function in the remote infrastructure;
sending the corresponding web address to the client device, wherein the code section of the web application script at the client device is modified by replacing the web application function within the code section with additional code generated for the web application function, the additional code including a stub function comprising a call to the copy of the web application function in the remote infrastructure utilizing the corresponding web address; and
running the copy of the web application function in the remote infrastructure in response to invocation of the stub function at the client device.

19. The system of claim 18, wherein the system comprises one or more computer servers.

20. The system of claim 18, wherein the operations further comprise:

sending one or more execution results returned by the copy of the web application function in the remote infrastructure to the client device.

* * * * *